Dec. 15, 1964   M. C. TASSLER   3,161,711
STRETCHING OF THERMOPLASTIC FILM TO IMPROVE
THICKNESS UNIFORMITY
Filed March 29, 1963   2 Sheets-Sheet 1
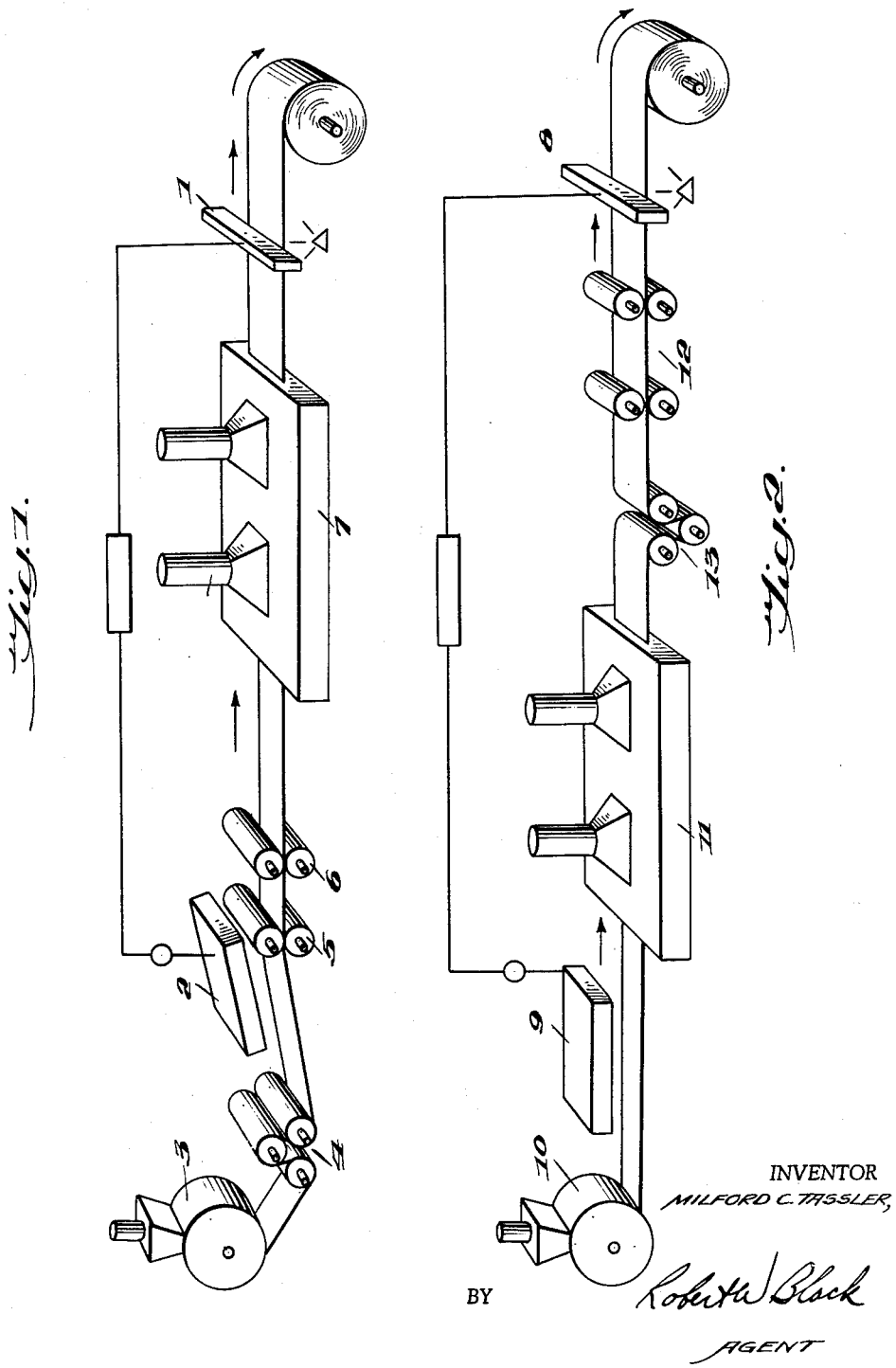
INVENTOR
MILFORD C. TASSLER,
BY
Robert W. Block
AGENT Dec. 15, 1964    M. C. TASSLER    3,161,711
STRETCHING OF THERMOPLASTIC FILM TO IMPROVE
THICKNESS UNIFORMITY
Filed March 29, 1963    2 Sheets-Sheet 2
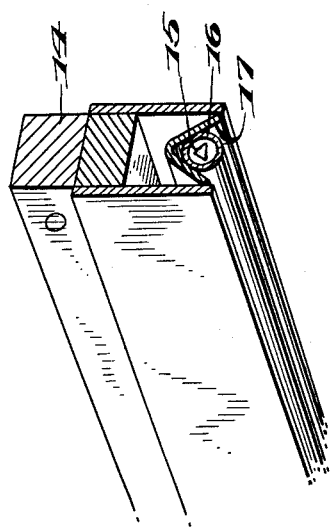
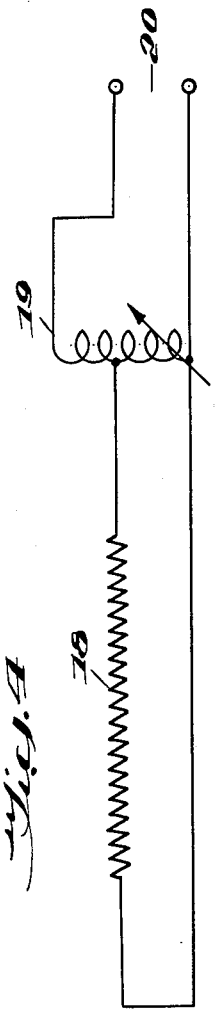
INVENTOR
MILFORD C. TASSLER,
BY Robert W Black
AGENT United States Patent Office 3,161,711
Patented Dec. 15, 1964

3,161,711
STRETCHING OF THERMOPLASTIC FILM TO
IMPROVE THICKNESS UNIFORMITY
Milford Charles Tassler, Circleville, Ohio, assignor to
E. I. du Pont de Nemours and Company, Wilmington,
Del., a corporation of Delaware
Filed Mar. 29, 1963, Ser. No. 270,138
3 Claims. (Cl. 264—289)

This invention relates to a process for improving thickness uniformity of thermoplastic polymeric films and more particularly to a process adaptable to continuous operation for improving thickness uniformity of polyethylene terephthalate film.

This application is a continuation-in-part of application Serial No. 104,309, filed April 20, 1961, now abandoned.

It is well known in the prior art to heat polymeric film to facilitate the improvement of film properties by stretching. It is also known to apply heat during stretching preferentially to the heavier gauge bands within the film to reduce tenacity and permit greater stretching with the resultant gauge reduction. Applying heat preferentially to heavier gauge bands in the film while under tension is often ineffectual and can increase the magnitude of some of the existing gauge variations. Thinner portions of the film which are adjacent to thick portions will be unintentionally heated by the overlap of the source of heat, since the source is not continuously variable across the film and heating cannot be precisely limited to the thicker portions. Further, non-uniform stretching of the extruded film sheet makes it difficult to accurately establish the relationship of the position of the gauge deviation of the stretched film to its location on the extruded film earlier in the process stream. The thinner portions, which are inadvertently heated, will stretch relatively more than the thicker sections. The net result is a reduction in gauge in portions of the film where gauge reduction is not desired.

It is not economically feasible to eliminate all of the variables in the extrusion of the film and produce a sheet of film which after stretching, will result in a film of the required degree of gauge uniformity. Some of the variables can be eliminated by adjustment of the opening of the extrusion die lips, but interactions of adjustments from one section of the lip to another can reduce the effectiveness of this means of control. Accordingly, it is desirable to improve the gauge uniformity of the film subsequent to extrusion.

It is an object of this invention to provide a process for improving thickness uniformity of thermoplastic polymeric films. It is a further object to provide a process adaptable to continuous operation for improving thickness uniformity of a polyethylene terephthalate film. A still further object is to provide a process for the gauge control of polymeric films which obviates the harmful effects of inadvertent heating of thinner portions of the film and enable production of a more uniform film. These and other objects will appear hereinafter.

These and other objects of this invention are accomplished by the process comprising preferentially heating a substantially amorphous thermoplastic polymeric film while substantially free from tension along at least one selected longitudinal lane of greater thickness than the adjacent thinner portions of the film; cooling the film to sharpen the temperature differential between the thinner portions and the longitudinal lane of greater thickness and thereafter stretching the unsupported film to impart at least lateral tension to the film, thereby improving the thickness uniformity of the film.

A preferred embodiment of this invention comprises heating a substantially amorphous thermoplastic polymeric film having transverse thickness variation along selected longitudinal lanes containing longitudinal bands of greater thickness than the remainder of the film and thereafter sequentially stretching the unsupported film in the longitudinal direction and in the transverse direction.

Briefly stated, this invention comprises the preferential heating of a selected lane or group of lanes of a substantially amorphous thermoplastic polymeric film immediately prior to subjecting it to stretching forces. In the instant between heating and stretching the thicker portions cool more slowly than the thinner portions of the film, thus sharpening the temperature differential between them and allowing the thicker portions to stretch more upon application of force and tending to bring the film to a uniform cross-section.

One of the most difficult features of controlling the gauge at a point remote from the sensing of thickness deviation is the establishment of the exact relationship between the transverse location on the film where the deviation is sensed to the corresponding location earlier in the process stream where the corrective adjustment is made. Hence, corrective action may not coincide with deficiency. This is particularly true when the process tends to grossly alter the profile of the film from the point of origin at the extrusion lips to the thickness sensing of the stretched film near the end of the process, as in the case of polyester films. The present invention is particularly advantageous since the extent of correction is generally a function of the extent of deviation with a minimum of deleterious effect due to unintentional heating of thin portions of the film.

In the usual process for the manufacture of a film such as polyethylene terephthalate, the molten polymer is extruded by pressure from a die to a web. This hot extrudate passes immediately to a cooled drum where it is quenched, leaving the film in a substantially amorphous condition. This film then passes to the first stretching operation. This stretch can be in the longitudinal direction by stretching the film between two sets of rolls by operating one set at a higher speed than the other or the stretch can be in the transverse direction by means of a tenter frame wherein film is stretched by the use of moving, diverging clips or similar clamp devices. Normally it is preferred to stretch the film in both directions with one of the above stretching operations following the other, the stretching operation which precedes being a matter of preference in the particular case.

Optionally heat treatment to fix or set the structure of the film can be used at various points on the process stream.

Such a process will be described in detail hereinafter, reference being had to the accompanying drawings, wherein:

FIGURE 1 diagrammatically illustrates preferential heating prior to nip roll longitudinal direction stretching, FIGURE 2 diagrammatically illustrates preferential heating prior to the first stretch in the transverse direction, FIGURE 3 shows a sectional view of a typical individual heater, and FIGURE 4 shows the circuit diagram of one form of heater.

Advantageously, in the practice of this invention, heat is applied to a selected lane or lanes of the film web in the amorphous state prior to application of stretching forces. In one embodiment of the invention as shown in FIGURE 1, the deviation of thickness is sensed at a location after the stretching operation, preferably near the end of the process as indicated by 1. This sensing can be by manually operated means or by an automatic device as is known to the art. Based on the sensed thickness deviation, an appropriate lane or group of lanes is heated by a heater 2, immediately after the quench drum 3 and pre-heat rollers 4 and before passing to the first set of nip rolls 5. Longitudinal stretching occurs between slow nip rolls 5 and the fast nip rolls 6. Since the film is normally stretched in two directions, the transverse direction stretching tenter is shown at 7.

Referring to FIGURE 2, wherein the adaptation of this invention to the process where the first stretch is in the transverse direction is diagrammatically illustrated, the sensing means 8 detects one or more deviations in a manner similar to that described for FIGURE 1. According to the sensed deviation the appropriate lane heater in heater assembly 9 is acuated which heats the appropriate lane or group of lanes of the amorphous film web after it leaves the quench drum 10 and before it passes into the transverse direction tenter stretcher 11. Here again, since it is normal to stretch the film in two directions, the nip roll longitudinal stretcher 12 is shown following the tenter 11. The preheat rollers 13 for the nip roll longitudinal stretches 12 follows the tenter frame 11.

To accomplish specific lane heating, this invention employs a heater assembly comprising a plurality of tubular element electrical heaters disposed parallel to each other in the longitudinal direction. A typical individual heater is shown in FIGURE 3. The heater is attached by a suitable means to a supporting framework (not shown) by a support 14. A radiant heating element 15 is encased in a tubular enclosure 16 and surrounded on the side away from the web by a reflecting shield 17. The primary purpose of the shield is to reduce transverse radiation and limit the effect of the heater as much as possible to the specific lane involved.

A series of heaters is suitably mounted over the film immediately ahead of the slow nip rolls or immediately ahead of the film's entry to the tenter according to the stretching sequence to be followed. The distance between the heaters and slow nip rolls or tenter must be such that the unintentionally heated thin portions of the film will become cool prior to stretching. There are many variables that determine this distance, e.g., the rate of film travel, the thickness deviation of the film and the temperature of the heaters, and can best be determined from the conditions of a particular run.

Preferably, the heaters are disposed for the full width of the film web and are spaced with a center-to-center distance of one inch. The heaters, which are mounted so that their positions can be adjusted transversely, are about ¾" wide; hence, transverse movement is possible and the exact location and relative spacing can be pre-selected to suit the particular conditions.

Also, the distance of the heater above the film surface can be varied to suit the particular conditions, i.e., rate of film travel and temperature of the heater. This distance must be relatively close to the film and in the usual case, less than one inch. The closer the heater is to the film surface the greater the precision in controlling the preferential heating between thicker and thinner portions of the film; however, the heater cannot be so close as to give relatively unheated areas between adjacent heaters. The heater can be oriented parallel to the film surface or either end tilted slightly toward the surface. In this way either specific coverage of a banded lane or wide coverage of a thick area can be obtained.

The temperature to which the film is heated is regulated by a voltage control unit attached to each heater. This voltage is set in advance according to the thickness deviation of the film and the rate of film travel. The rate of stretch of thicker lanes is effectively altered if the temperature difference between the thicker and thinner portions of the film is as little as 0.1° C. Of course, the heater for the thickest lane will be turned to a higher voltage than the remaining heaters. The voltage of the other heaters are adjusted according to the extent to which the corresponding lane was thicker than the desired film.

Referring to FIGURE 4, the heater 18 is controlled by a voltage regulating device such as an auto-transformer 19 which is capable of controlling the output of the heater from zero to its maximum by variation of the input voltage supplied from the line 20. The individual auto-transformers can be controlled manually or by an automatic device which senses thickness deviation in the web, converts the deviation signal to a functional signal which operates a controller which varies the voltage in an appropriate manner according to the deviation. Of course, the automatic operation of preferential heating involves, as known to the art and associated fields, means to traverse and scan the web, a thickness sensing combination and amplification and control circuits.

In the process of this invention, heating a selected lane or group of lanes is used for longitudinal direction stretching and also for transverse direction stretching of the film web. The gauge improvement observed for either type of stretch operation occurs as a result of transverse forces although transverse forces in the longitudinal stretching operation are of indirect origin. It is well known in the art that as a film is stretched in the longitudinal direction the flow of mass in the direction of stretch causes a resultant force in the transverse direction which causes a width reduction known as "neck-in." The transverse forces tending to counteract "neck-in" have the same general effect as transverse forces applied directly in stretching the film in the transverse direction.

Stretching the film to impart at least lateral tension can then be accomplished two ways, i.e., by a direct stretching force in the transverse direction or as a resultant or indirect force in the transverse direction caused by a direct stretching force in the longitudinal direction. In the normal, preferred process for orienting polymeric films, the film is sequentially stretched, in both directions. The film can be stretched first in the longitudinal direction and then in the transverse direction or it can be stretched first in the transverse direction and then in the longitudinal direction.

In order that this invention might function properly it is essential that the means employed in the stretching operation subsequent to establishment of temperature differentials in the film, provide a minimum of equilibration of temperature across the film. Accordingly, it is essential to apply stretching forces while the film is not in heat-transfer contact with bodies which would result in this temperature equilibration. Hence, there is the requirement that the film should be unsupported during stretching. This permits stretching by a nip roll apparatus and by a tenter frame.

This invention is effective in use immediately before stretching either in the longitudinal or transverse directions as long as the polymeric film is in a substantially amorphous condition. Therefore, any amorphous thermoplastic crystallizable polymer can be used in the manufacture of films according to the process of this invention. Such polymers would include, although by no means complete: polyethylene-2,6-naphthalate; polytetramethylene-1,2-dioxybenzoate; polyethylene - 1,5 - naphthalate; polyhexamethylene adipamide; polyhexamethylene sebacamide; polycaprolactam; and copolymers of ethylene terephthalate and ethylene isophthalate. Films of substantially amorphous non-crystallizable polymers such as polystyrene can also be employed. The most preferred process relates to the treatment of substantially amorphous polyethylene terephthalate film.

The invention will be more fully understood by referring to the following examples.

*Example I*

A film was extruded at 150 pounds per hour from polyethylene terephthalate, which had an intrinsic viscosity of 0.54. The extrudate, which had a nominal thickness of 10 mils, was quenched on a cool drum to a temperature of about 50° C. The extrudate was then passed over a series of preheat rolls maintained at 85° C., and then through a nip-roll stretching apparatus. The nip roll apparatus had first a pair of slow rolls, one positioned above the other engaging the film between them; the upper roll was surfaced with rubber, and the lower was metal surfaced. Heated oil in the interior of these rolls maintained them at 87° C.

The film then passed to a second similar pair of rolls, the fast nips. These were disposed to engage the web at a point 6½ inches from the slow nips, and were heated to about 50° C. These nip rolls effected 3× stretch in the longitudinal direction.

The film was then passed through a tenter oven at 85° C. and stretched 3× in the transverse direction, and finally it was heat-set in the latter part of the oven (200° C. for 10 seconds). The film output was 20.25 yards per minute. The thickness, determined by an electromicrograph, had a variance of ±5.5 to 6.0% from the nominal 1 mil.

The run was continued with the lane heaters ahead of the slow nips in operation over the observed thicker lanes. The heaters comprised strip radiant heaters which were disposed parallel to the film in the direction of film travel. The heaters were ⅝ inch from the film, and extended to a point 6 inches from the point of entry of the film into the slow nip rollers. The heaters were placed at an interval of one heater to an inch across the film. It had previously been observed that by varying the voltage to each heater by an auto-transformer within the range of 40 to 100 volts that the temperature of the film in production under these conditions could be varied so that a heated lane could be varied from 0.1° to 0.5° C. above the temperature of an unheated adjacent lane, and that this temperature difference effectively alters the rate of stretch of thicker lanes. Accordingly, the thickest of the observed lanes were heated by setting the voltage near the higher end of the indicated range and adjusting the voltage of other heaters according to the extent to which the corresponding lane was thicker than the desired film. The film produced under these conditions had a variation of ±2.5 to 3% of the nominal 1 mil, or approximately 100% improvement in uniformity.

*Example II*

Example I was repeated except that a 6 inch wide band was created in the finished film that was 60 to 65% higher than the balance of the film sheet. Three lane heaters positioned over the band were turned on at settings of 95 to 100 volts of their 120 volt control powerstats. The sheet thickness under the band was reduced to a variation of about ±5% from the control sheet.

What is claimed is:

1. A process comprising: preferentially heating a substantially amorphous thermoplastic polymeric film while substantially free from tension along at least one selected longitudinal lane of greater thickness than the adjacent thinner portions of said film; cooling the film to sharpen the temperature differential between said thinner portions and said longitudinal lane of greater thickness and thereafter stretching the unsupported film to impart at least lateral tension to said film, thereby improving the thickness uniformity of said film.

2. The process of claim 1 wherein the substantially amorphous thermoplastic polymeric film is polyethylene terephthalate.

3. A process comprising: preferentially heating a cast, substantially amorphous polyethylene terephthalate film while substantially free from tension along selected longitudinal lanes of greater thickness than the adjacent thinner portions of said films; instantaneously cooling the film to sharpen the temperature differential between said thinner portions and said longitudinal lanes of greater thickness and thereafter sequentially stretching the film in the transverse direction and in the longitudinal direction while in an unsupported condition, thereby improving the thickness uniformity of said film.

References Cited in the file of this patent
UNITED STATES PATENTS

| | | |
|---|---|---|
| 2,412,187 | Wiley et al. | Dec. 3, 1946 |
| 2,955,321 | Fortner et al. | Oct. 11, 1960 |